July 3, 1923.
A. A. WICKLAND
CIRCULAR MILLING MACHINE
Filed March 25, 1922
1,460,525
4 Sheets-Sheet 1
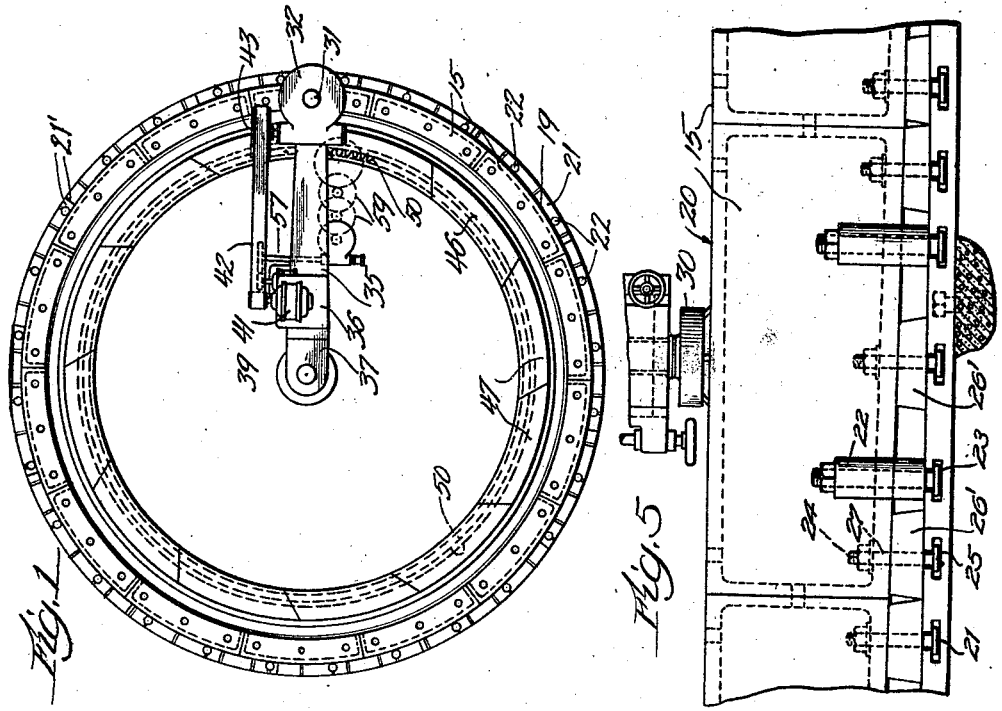

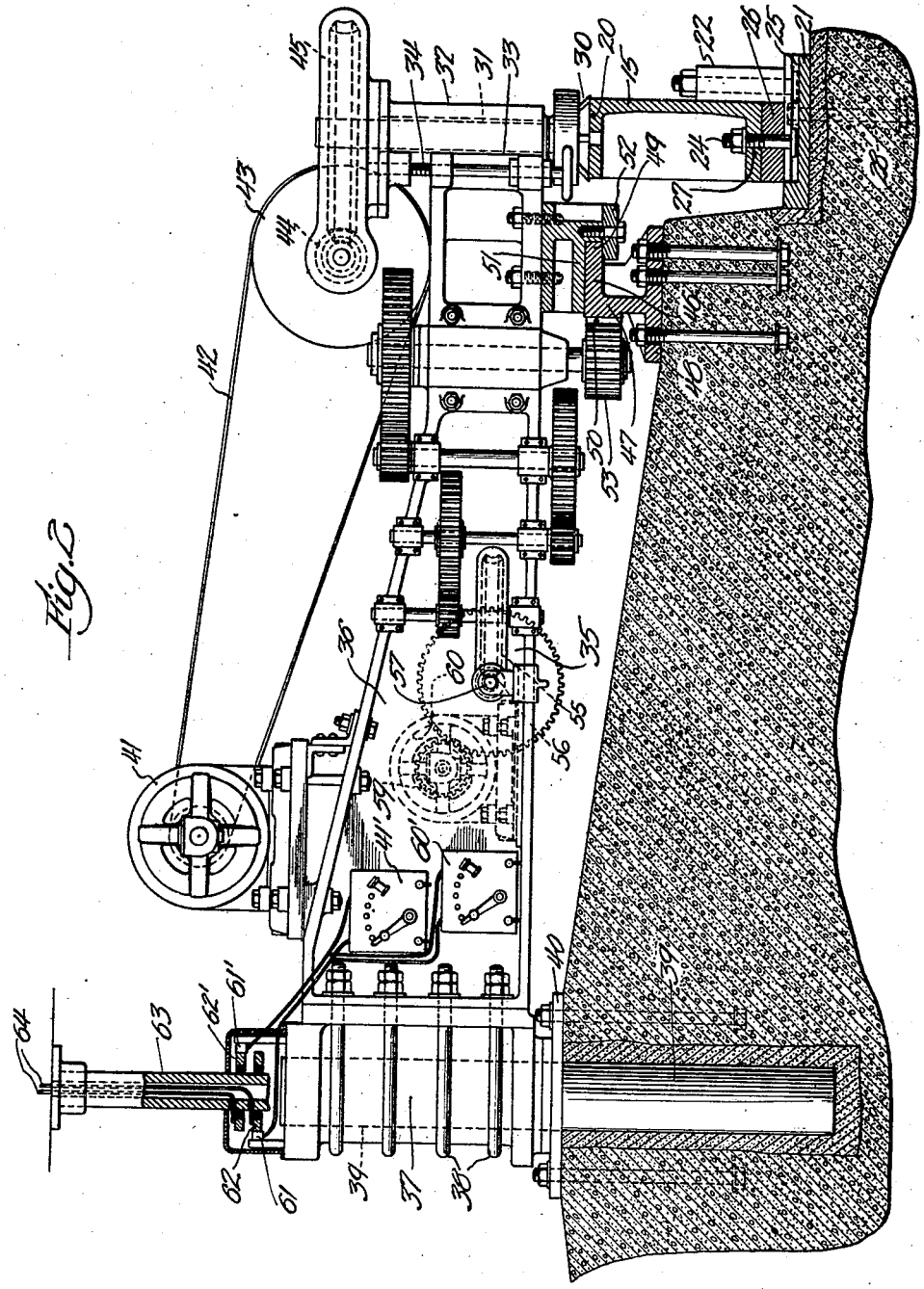

July 3, 1923.
A. A. WICKLAND
1,460,525
CIRCULAR MILLING MACHINE
Filed March 25, 1922
4 Sheets-Sheet 3
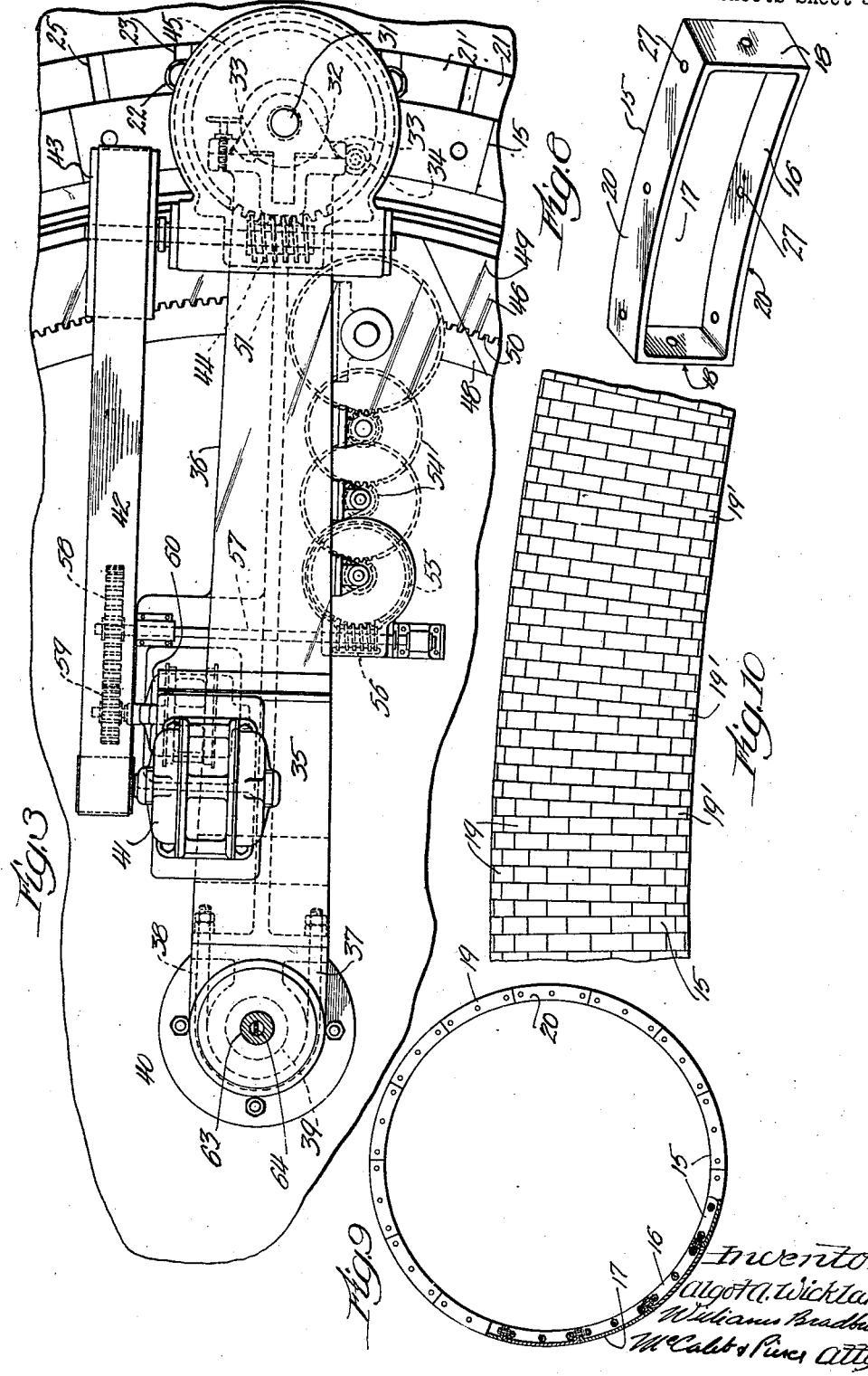

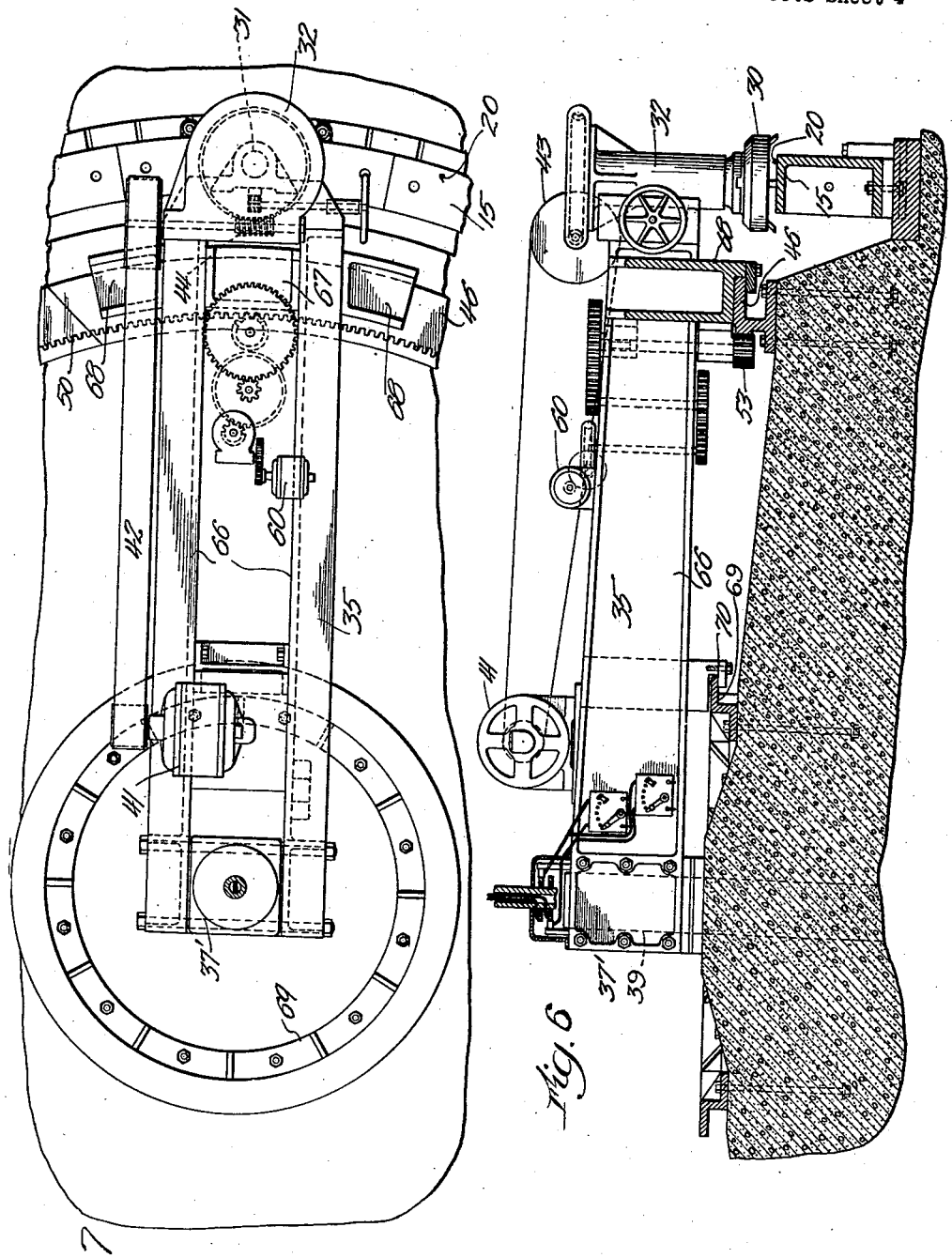

Patented July 3, 1923.

1,460,525

UNITED STATES PATENT OFFICE.

ALGOT A. WICKLAND, OF CHICAGO, ILLINOIS, ASSIGNOR TO CAMPBELL, WYANT & CANNON FOUNDRY CO., OF MUSKEGON, MICHIGAN, A CORPORATION OF MICHIGAN.

CIRCULAR-MILLING MACHINE.

Application filed March 25, 1922. Serial No. 546,601.

*To all whom it may concern:*

Be it known that I, ALGOT A. WICKLAND, a citizen of the United States, and resident of Chicago, in the county of Cook and State of Illinois, have invented a certain new and useful Improvement in Circular-Milling Machines, of which the following is a full, clear, concise, and exact description, reference being had to the accompanying drawings, forming a part of this specification.

My invention relates to surfacing machines and the like, but more particularly to circular milling machines. In accordance with my invention, the frame of the machine revolves about a stationary pivot and carries at its free end a cutting tool.

One object of my invention is to provide a machine of this class for surfacing arcuate segments or other work in which the cutting tool and its frame operate continually, it being possible to replace finished work with unfinished work without disturbing the operation of the machine.

Another object of my invention is to provide a surfacing machine with a rotating arm having a cutter at its free end, the arm being supported adjacent the cutting tool, and the driving means for rotating the arm also being applied adjacent the cutter whereby a lighter frame for the arm may be employed, and whereby more accurate work is insured.

I further contemplate a milling machine in which the milling cutter is carried on a revolving arm, and in which the driving means for the milling cutter, and the driving means for revolving the arm, are all located upon the arm. In this way, electric motors may be used as the driving means, it being necessary merely to use a collector ring for supplying current to the motors, and thus a substantial amount of gearing and other power transmitting means may be omitted.

As my invention will best be understood by a description of a specific embodiment thereof, I shall refer to the accompanying drawings, which illustrate such a machine, wherein Figure 1 is a plan view of the machine;

Figure 2 is a radial vertical section certain portions in the background, for the sake of clarity, being omitted;

Figure 3 is an enlarged detail plan view of the revolving frame;

Figure 4 is a front elevation of the cutting tool and work table;

Figure 5 is a view similar to Figure 4, but showing the work in a different position;

Figure 6 is an elevation, partly in diametrical section, of a modified construction of the machine, certain parts in the background being omitted for the purpose of clarity;

Figure 7 is a plan view of the construction shown in Figure 6;

Figure 8 is a view in perspective of one of the segments of work which the machine is peculiarly adapted to surface;

Figure 9 is a vertical section of the segments shown in Figure 8, as they are ultimately assembled as a tunnel support; and Figure 10 is a plan view of such a tunnel support.

Similar characters of reference refer to similar parts throughout the several views.

I shall first describe the character of work which the machine shown is especially adapted to perform. In Figure 8, I have shown a segment 15 of a railroad or vehicle tunnel wall, which has a diameter of some thirty or forty feet, the segment being formed of cast iron, and constituting a box-like piece having an open side 16. The back side 17 is arcuate, and the ends 18—18 are radial to the axis of the arc of the back 17. When these segments are placed together end to end they constitute an annular ring 19, as shown in Figures 9 and 10, the rings being adapted to be placed end to end, as shown in Figure 10, to form a complete tunnel wall. The purpose of the machine here shown is to surface the lateral edges 20—20 of the segments 15, in order that the lateral sides of the rings 19 may be made to form watertight joints.

The segments 15, after their end surfaces 18 have been properly surfaced, are placed end to end upon a stationary annular work table 21 of the machine, so that they form an assembled ring 19, the work table 21 having a diameter substantially that of the annular tunnel rings 19. The segments are positioned radially by the contacting of their outer walls 17 with vertical sleeves 22 held by bolts co-operating with T-slots 23 in the work table 21. The segments are secured to the work table 21 by means of bolts which co-operate with T-slots 25 in the table and pass upwardly through spacing blocks 26 and through holes 27 in the lateral sides of the segments, where the bolts are clamped by suitable nuts. The work table itself comprises segments 21' firmly secured in the concrete foundation of the machine, as by bolts 28. When the segments are thus assembled on the work table, their upper lateral surfaces 20 lie substantially in a horizontal plane.

A rotating milling tool 30 is supported by its vertical spindle 31 in a vertically adjustable head 32, which may be held in any suitable guideway 33 and adjustable by the hand wheel of a threaded vertical rod 34.

The guideway 33 is supported at the free end of the arm 35 which comprises a frame member 36 and a sleeve member 37, to which it is bolted by the U-bolts 38. The sleeve member 37 surrounds a stationary vertical post 39, which is securely and non-rotatably supported in the concrete foundation of the machine. The sleeve member 37 bears upon a thrust plate 40, which rests upon the top of the concrete foundation and surrounds the post 39.

The frame 36 supports an electric motor 41, which drives through a belt 42 a pulley 43 on the shaft of which is keyed a worm 44, the worm engaging a worm-wheel 45 which rotates the spindle 31 of the cutting tool 30. The pulley 43, the worm 44 and the worm-wheel 45 are all borne in portions of the head 32. It will be noted that because of the long radius between the motor 41 and the pulley 43 that the head 32, together with the cutting tool 30, may be adjusted vertically by the screw 34 without any compensation of the driving means.

An annular supporting rail 46 lies concentrically about the post 39 and radially adjacent the work table 21, the supporting rail being composed of segments 47, which comprise a base flange 48, by which the segments are anchored in the concrete base, a rail head 49 and a gear rack 50 on the inner lateral side. A block 51 is supported at the under side of the free end of the frame 36 and bears upon the upper surface of the rail head 49. The block 51 also carries a downwardly spaced plate 52, which underlies the outer portion of the rail head 49, whereby the free end of the arm 35 is prevented from upward as well as downward displacement.

It is to be noted that the ends of the segments 47 are cut non-radially in such manner that the rail 46 presents non-radial joints to the radial forward end of the block 51, as the latter revolves with the arm 35 around the rail. In this way, there is no tendency of the block 51 to catch, should the juxtaposed edges of a pair of segments be vertically offset.

As previously stated, the inner lateral edges of the rail 46 are provided with a gear rack 50. A pinion 53 engaging the rack 50 is supported from the frame 36, and is driven through a train of vertically shafted reduction gears 54—54, similarly supported on the frame 36, by a worm-wheel 55. The worm-wheel 55 is driven by a worm 56 secured to a shaft 57, which passes transversely through the web of the frame 36 and carries a gear 58 which is driven by a pinion 59 on the armature shaft of a small electric motor 60, which is carried by the frame 36. The pinion 59 and gear 58 are preferably easily removable from their shafts so that they may form change gears for which differently proportioned gears may be substituted to change the speed of revolution of the arm 35 about the post 39.

I prefer to mount upon the frame 36 the starting rheostats 41' and 60' for the motors 41 and 60 respectively, current being supplied thereto through wires leading to the insulated brushes 61 and 61' on the upper end of the sleeve member 37. The brushes 61 and 61' co-operate respectively with a pair of insulated collector rings 62 and 62', positioned around a stationary pipe 63, which depends from any suitable overhead support and carries the lead wires 64—64.

In operation, the segments 15 are assembled in a complete ring on the work table 21 and the two motors are started, a proper vertical adjustment of the cutting tool 30 being made by means of the screw 34. While the cutting tool is rotated by the motor 41 to mill the upper surfaces 20 of the segments, the smaller motor 60 drives the pinion 53 through its associated reduction gears around the rack 50 on the inner side of the rails 46, thereby slowly advancing cutting tool 30 around the ring of segments 15.

Where the work table is of large diameter, say thirty feet, I prefer to use a motor 60 of such size that through its associated reduction gears the arm 35 is rotated once every hundred minutes or so. This gives an operator ample time in which to follow the arm in its movement, replacing finished segments with unfinished segments. By the removal of the nuts from the clamping bolts 24 a finished segment may be withdrawn vertically and an unfinished segment inserted, the segment being positioned by the stop sleeves 22. In case the segment to be machined has already been finished on one of the surfaces 20, suitable shims may be introduced between the blocks 26 and the segment to properly position it vertically.

By referring to Figure 10, it will be noted that in the use of the segments 15 in constructing tunnels, when it is desired to make a bend in a tunnel certain of the annular rings 19 are tapered as shown at 19', that is, the planes of the two lateral sides of such a ring are not parallel. When segments for these tapered rings 19' are to be surfaced I prefer to employ a set of spacing blocks 26' which are previously cut to the correct thickness whereby a segment for a particular position in a tapered ring 19' may be secured to the table 21 at the proper angle thereto by the selection of the proper blocks 26' (see Figure 5 in which this angle is shown in exaggeration). These blocks 26', if preferred, may bear indicia which associate them with the particular position of a segment in a tapered ring 19'.

In Figures 6 and 7, I have shown a similar machine, which embodies a somewhat different construction of the arm 35 whereby the cost of construction may be materially cheapened by the use of structural steel, and in which the supporting blocks which engage the supporting rail may easily be spaced further apart to insure greater rigidity of the cutting tool support. A sleeve or block 37' surrounds the supporting post 39. To opposite sides of the block 37 are bolted channel beams 66 which extend radially in spaced relation to a spacing block 67 at their ends, the spacing block 67 supporting the vertically reciprocable head 32 which bears the cutting tool 30. The cutting tool is rotated in a manner similar to the construction shown in Figures 1 to 5 inclusive by a motor 41 supported on one of the beams 66. The arm is similarly rotated about the rail 46 by the small motor 60. A shoe 68 is secured to the outer side of each beam 66, its bottom being adapted to co-operate with the rail 46. It will be seen that by this construction it is feasible to place the engaging shoes 68 a considerable distance apart to guard against any twisting strain of the arm 35 due to the resistance of the cutting tool 30 to rotation by the pinion 53. A secondary rail 69, preferably cast as one piece, may be placed about the post 39 and a shoe 70 depend from the beam 66 to co-operate with the rail, the purpose of the rail 69 being to supplement the rail 46 in steadying the movement of the arm in its rotation about the pivot post.

While I have described a machine for milling certain surfaces of a particular form of work, it is to be understood that I do not contemplate that the utility of my invention is thus limited.

For the production of work of the kind hereinabove described, my invention enables me to build a highly efficient machine tool, without resort to the use of large size machines in its construction. Furthermore, the machine of my invention is easily transported in relatively small pieces, and may be erected in the place where its work is to be done. After the various parts have been mounted and imbedded in a concrete base, as shown, the table and the rail may be accurately finished in a plane perpendicular to the post by the cutter of the machine itself, thus avoiding the need of any large boring mill in its construction.

Having thus described my invention, what I claim is:

1. The combination in a surfacing machine of a vertical post imbedded in a concrete foundation, an arm revolvable about said post, a stationary annular support concentric with said post, said support comprising a plurality of segments anchored in a concrete foundation, means on said arm engaging said support, a stationary annular work table secured in a concrete foundation, a cutting tool on said arm adjacent said table, and means for revolving said arm.

2. The combination in a surfacing machine of an arm, a pivot for said arm imbedded in a concrete monolith, an annular gear rack concentric with said pivot and composed of metal segments secured to said monolith, an annular work holding table concentric with said pivot and comprising metal segments secured to said monolith, a cutting tool on said arm, and means on said arm co-operating with said gear rack to revolve said arm.

3. The combination in a milling machine, of an arm revolving about a stationary axis, a cutting tool supported on said arm, a stationary table for holding work to be milled, a stationary annular support composed of segments, bearing surfaces on said segments, means on said arm for engaging said bearing surfaces, the adjacent ends of said segments having non-radial joints.

4. The combination in a milling machine of an arm revolving about a stationary axis, a cutting tool supported on said arm, a stationary table for holding work to be milled, a stationary annular support composed of segments, bearing surfaces on said segments, means on said arm for engaging said bearing surfaces, the adjacent ends of said segments being so formed that said bearing surfaces present joints non-parallel with the forward edge of said engaging means.

5. A milling machine comprising a stationary upright post, an arm pivoted thereon, a stationary arcuate support for said arm, means on said arm for engaging said support, a stationary arcuate member, driving means on said arm and adjacent its free end for co-operating with said member to revolve said arm, a rotary cutting tool supported on the free end of said arm, and adapted to engage work to be milled, an electric motor on said arm for driving said means, a second electric motor on said arm for driving said cutting tool, and a collector ring through which electric current is supplied to said motors.

6. A machine tool comprising an arm rotatable about a stationary vertical pivot, a stationary arcuate horizontal support, means on said arm and adjacent its free end for engaging said support, a stationary arcuate member, driving means on said arm and adjacent its free end for co-operating with said member to revolve said arm, a cutting tool carried on the free end of said arm and adapted to engage work to be machined, an electric motor on said arm for driving said means, and a collector ring through which electric current is supplied to said motor.

7. The combination in a surfacing machine of an arm revolving about a stationary axis, a stationary annular work table, a stationary annular support for said arm adjacent said table, means on said arm for engaging said support, said support comprising an annular toothed rack, a pinion on said arm for engaging said rack to rotate said arm, and a cutting tool carried by said arm.

8. A surfacing machine comprising an arm pivoted about a stationary vertical axis, a stationary annular work holding table, a stationary annular support for said arm adjacent said table, means on said arm for engaging said support to steady the arm, a stationary annular gear rack, means on said arm which by co-operation with said gear rack continually revolves said arm completely around said table, and a cutting tool on the end of said arm for engaging work on said table.

9. A surfacing machine comprising an arm revolvable about a stationary axis, a stationary annular work table, an annular gear rack adjacent said table, a pinion on said arm for revolving the latter, and a cutting tool carried on said arm and adapted to engage work on said table.

10. A milling machine comprising a stationary pivot, a block rotatable on said pivot, a pair of spaced beams secured at the lateral sides of said block and extending radially therefrom, a head secured at the free ends of said beams, said beams and head constituting a revolving arm, a milling cutter rotatably mounted in said head, means on said arm for rotating said cutter, means on said arm co-operating with said stationary means for revolving said arm, an annular stationary support, and a pair of spaced engaging members supported on said arm for engaging said support.

In witness whereof, I hereunto subscribe my name this 23rd day of March, 1922.

ALGOT A. WICKLAND.

Witnesses:
EDNA V. GUSTAFSON,
EMILE J. BOURGEOIS.